March 19, 1963 A. P. SCHNYDER 3,081,820
PULP PREPARATION
Filed Jan. 16, 1958 2 Sheets-Sheet 1

INVENTOR
Auxilius P. Schnyder
BY
Philip D. Junlems
AGENT

March 19, 1963 A. P. SCHNYDER 3,081,820
PULP PREPARATION

Filed Jan. 16, 1958 2 Sheets-Sheet 2

INVENTOR
Auxilius P. Schnyder
BY
Philip D. Junkins
AGENT

United States Patent Office 3,081,820
Patented Mar. 19, 1963

3,081,820
PULP PREPARATION
Auxilius P. Schnyder, Teaneck, N.J., assignor to The Lummus Company, New York, N.Y., a corporation of Delaware
Filed Jan. 16, 1958, Ser. No. 709,400
7 Claims. (Cl. 162—246)

This invention relates to pulp preparation and more particularly to an improved form of blow tank including associated apparatus, and method of operation.

In the preparation of pulp by the sulphite or sulphate processes, there is a stage in which the digested cellulose-containing materials, after treatment in a closed cooker or digester at super-boiling temperature and pressure, are discharged into a blow tank to release or flash off steam. Materials from sulphate digesters are usually blown at full pressure at a temperature of 345° F., while materials from sulphite digesters are partially pressure relieved so that the blow temperature is somewhat lower than the cooking temperature of 290° F.

The digested stock, including about 10 to 12 percent solids, is too concentrated for further processing and is therefore diluted in the blow tank with diluting liquors to a pumpable consistency of from about 1½ to 4 percent solids. Further, the blow tank is usually of sufficient capacity to accommodate several cooks and to serve as a storage tank since the dilute stock demand in later processing steps requires uniform flow from the blow tank whereas the digesters usually provide batch-wise flow to the blow tank.

In the past blow tanks have been constructed of a conical base, cylindrical side wall defining an intermediate zone, and a conical top opposing the base cone and having a top cylinder mounted thereon. Entering stock normally is fed to the tank through a blow pipe which opens tangentially into the top cylinder. The stock is thereby formed into a descending spiral band flowing around the interior wall of the cylinder and then falls to the level at which the stock stands within the tank. It has been found that in the operation of such tanks there is appreciable splashing of the entering stock resulting in entrainment of fibers with escaping or flash steam leaving the stock and passing out of the top of the blow tank.

It has also been a common practice to place an agitator in the base cone of the blow tank to facilitate the dilution of concentrated blown stock with diluting liquors entering the tank near the bottom. Further, suitable tramp iron traps are frequently used to remove tramp iron and other harmful foreign materials that collect at bottom of the tank to prevent the passage of such material out of the blow tank with dilute stock.

It is a principal object of the invention to provide an improved blow tank and method for the effective handling of concentrated stock from digesters or pressure cookers.

Another object of the invention is to provide an improved blow tank including novel bottom mixing of diluting liquor and concentrated digested stock.

A further object of the invention is the provision, in an improved blow tank, of means for jet condensing flash steam.

Still another object of the invention is to provide, in an improved blow tank, a novel treating zone in which dilute stock is treated so as to reduce the so-called knots of fibers.

A still further object of the invention resides in the provision of an improved blow tank including novel associated means for accumulating condensing water and hot condensate.

Yet another object of the invention resides in the provision of an integrated stock blow tank and condensate accumulating system in which jet condensing of flash steam in the blow tank is accomplished with cooled condensate from the accumulating system.

Further objects and advantages of the invention will appear from the following description taken in conjunction with the accompanying drawing.

Figure 1:
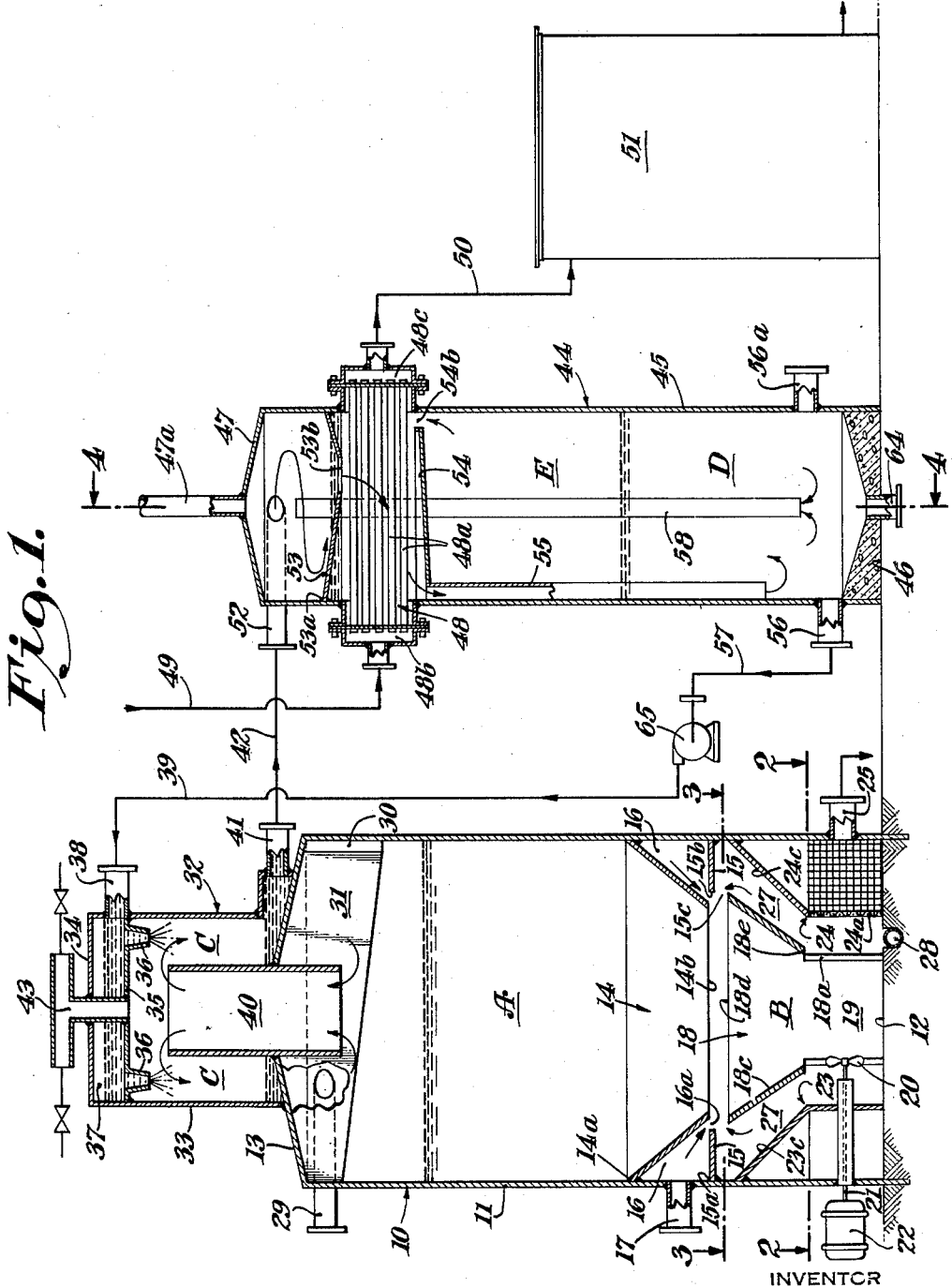
FIG. 1 is a vertical sectional view of an integrated system of blow tank and accumulator embodying a preferred form of the invention.

Referring to the drawings, wherein like reference numerals indicate like parts throughout, there is provided a blow tank, generally indicated at 10, functioning to receive, store and dilute concentrated stock, and comprised of a vertical annular wall 11 supported on and extending from base 12. The upper end of the tank is enclosed by top 13 and associated apparatus as described hereinafter.

Within the blow tank 10, intermediate of the base and top, there is mounted a restricting baffle 14 which extends at its outer edge 14a from wall 11 in descending and converging configuration thereby dividing the tank into an upper flash zone A and a lower stock dilution zone B. Access to zone B from zone A is through the opening in baffle 14 formed by baffle edge 14b. Directly below baffle 14 is an annulus or annular plate 15 which is fixed at its outer edge 15a to wall 11 and which extends inwardly toward the baffle 14 to a point short thereof whereby there is formed between the baffle 14 and the annulus 15 an annular dilution liquor distribution space 16 opening into zone B through an annular orifice 16a formed between edge 14b of baffle 14 and edge 15b of baffle 15. Dilution liquors enter liquor distribution space 16 through pipe 17 and pass through orifice 16a for mixing with flashed stock descending along baffle 14 into zone B.

At the bottom of zone B, and extending upwardly from the base of the tank toward baffle 14, there is centrally positioned a mixing baffle 18 comprised of lower vertical fluid directing vanes 18a and 18b which act as support for an annular upwardly diverging transition piece 18c. The transition piece 18c extends to a point just below edge 14b of baffle 14 and edge 15b of annulus 15, with the baffle 14 and the transition piece 18c combining to form a substantially continuous funnel for leading flashed stock and dilution liquors into mixing space 19 at the bottom of the tank for intimate mixing and separation of harmful foreign material from mixed diluted stock.

Intimate mixing of the flashed stock and diluting liquors is accomplished by a horizontal agitator-impeller 20 which is positioned between vanes 18a and 18b and under the lower edge 18e of transition piece 18c. Impeller 20 is driven by shaft 21 which extends through wall 11 from a driving motor 22. The shaft 21 is supported by recirculation baffle 23 which includes stock flow directing walls 23a, 23b and 23c. Bearing mountings (not shown) for shaft 21 and fluid seals (not shown) are provided at appropriate location within the baffle structure 23 to assume fluid tight operation. Flow directing walls 23a, 23b and 23c enhance the flow of dilute stock which is impelled around vanes 18a and 18b as illustrated by the flow indicating arrows of FIG. 2 and prevent a stock pile-up at any point upon base 12. Directly opposite baffle structure 23 and within tank 10 there is provided a stock outlet structure 24 comprised of screen walls 24a and 24b and cover wall 24c. The substantially symetrical configuration and position of outlet structure 24 with respect to baffle structure 23 further enhances the flow pattern of recirculated stock at the bottom of the tank 10 while permitting a continuous trouble free screened discharge of blown diluted pulp. Screened pulp leaves the blow tank through pipe 25 for further processing.

The impeller 20 draws partially mixed stock and diluting liquor through space 19 located between vanes 18a and 18b and directs mixed diluted stock through symmetrical spaces 26a and 26b defined by such vanes and wall 11 and also upwardly through annular space 27 defined by transition piece 18c and wall 11 toward annular orifice 15c formed between edge 15b and edge 18d of baffle 15 and 18, respectively.

Set within base 12 and extending beyond the extremities of annular wall 11 there is provided tramp iron trap 28, which collects deleterious particles carried over with the blown concentrated stock and which is periodically purged by inserting a plunger therethrough.

Concentrated stock enters the tank 10 through a blow pipe 29 which opens tangentially into the tank near the top of wall 11. The stock passes from blow pipe 29 into upper flash zone A through a vertical elongated opening 30 of a conduit 31 and is thereby formed into a flattened descending spiral band flowing around the interior of the tank and reaching down to the level at which the stock stands within zone A. Since the flattened descending spiral band is not terminated at some point within tank top 13, as is prevalent in known commerically operated below tanks, but is maintained as a smooth spiral band down annular wall 11, there is substantially no entrainment of fibers with flashing or escaping steam leaving the stock level.

Mounted on and integral with the top 13 of tank 10 there is provided a jet condenser, generally indicated at 32, in which the flashed steam, leaving the stock level, is condensed and discharged to a condensate accumulating system as hereinafter described. Condenser 32 is formed of a vertical annular wall 33 supported on and extending from the top 13 and is enclosed at its upper end by condenser top 34.

Within annular wall 33, intermediate of the tank top 13 and condenser top 34, there is mounted a distribution plate 35 having an annular orifice or ring of spray nozzles 36 disposed therein and which encloses and defines a condensing water distribution zone 37 with annular wall 33 and top 34. Condensing water enters the distribution zone 37 through condensing water inlet 38 via line 39 from an accumulator system. Extending upwardly through top 13 from flash zone A and into condenser 32 is an annular conduit 40 through which the flashed or escaping steam leaves flash zone A and passes into a condensing zone C of condenser 32. Condensing zone C is defined by the portion of conduit 40 extending beyond tank top 13, annular wall 33 and tank top 13. The flashed or escaping steam entering condensing zone C is contacted by sprayed condensing water from nozzles 36 and is collected with the condensing water as condensate and discharged from the bottom portion of zone C through condensate outlet 41 via line 42. Extending from plate 35 and through top 34 there is provided a pipe 43 through which non-condensable vapors are discharged.

Since the jet condenser 32 may be operating for only 10 to 15 minutes of a cycle of from 1 to 4 hours depending on the number of digesters in operation and the cooking time required for the charged cellulosic materials, there is provided an accumulator tank, generally indicated at 44, which collects hot condensate and provides a source of cool condensing water for the jet condenser. Accumulator 44 is comprised of a vertical annular wall 45 supported on and extending from a base 46 and is enclosed at its upper end by a top 47 having a vent pipe 47a extending therefrom.

Within accumulator 44, intermediate the base and top, there is provided a heat exchanger 48, including tubes 48a, through which cool water from line 49 is passed and heated, the heated water thereafter being discharged via line 50 to a hot water storage tank 51. Hot condensate leaving the blow tank 10 through line 42 enters the accumulator 44 through a condensate inlet 52 which opens tangentially into the upper portion of tank 44, thereby causing the condensate to spirally descend around the interior of wall 45 to a directing baffle 53 mounted above heat exchanger 48. Directing baffle 53 extends at its outer edge 53a from wall 45 in descending and converging configuration thereby forming a restricted passageway 53b for the condensate. Directly below exchanger 48 there is positioned a condensate collecting baffle 54, which is fixed at its periphery 54a to wall 45 and extends substantially across the accumulator, but which is provided with recirculation passage 54b. The baffle 54 is provided with a downcomer 55 which permits the cooled condensate collected on baffle 54 to pass to the bottom of accumulator tank 44 and into cold water zone D. Condensing water for condenser 32 is withdrawn from zone D through condensing water outlet 56 and is passed to such condenser via line 57. Make-up condensing water enters into zone D through cold water inlet 56a located adjacent condensing water outlet 56. Above zone D in the lower portion of the accumulator is hot water zone E. Extending from within zone D there is provided an overflow pipe 58 communicating with an overflow discharge trough 59, comprised of an overflow weir 60, walls 61 and 62, and a discharge outlet 63, and which is located on wall 45 adjacent heat exchanger 48.

Within base 46 there is provided a sludge outlet 64 which permits periodic removal of any pulp carried over with the hot condensate entering the accumulator from condenser 32.

Figure 2:
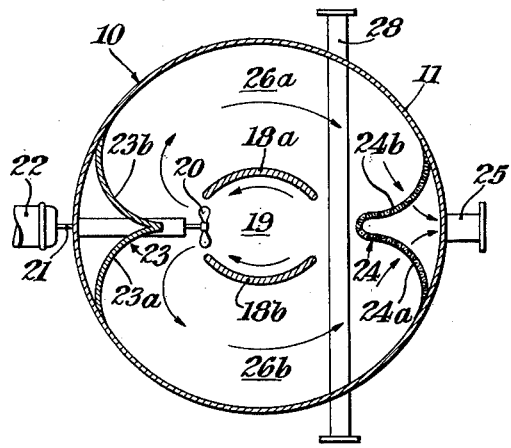
FIG. 2 is a horizontal sectional view of the blow tank taken on the line 2—2 of FIG. 1.
Figure 4:
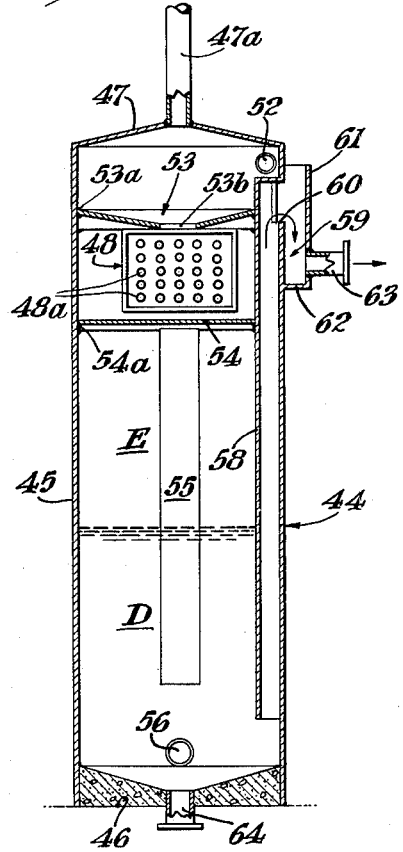
FIG. 4 is a vertical sectional view of the accumulator taken on the line 4—4 of FIG. 1.
Figure 3:
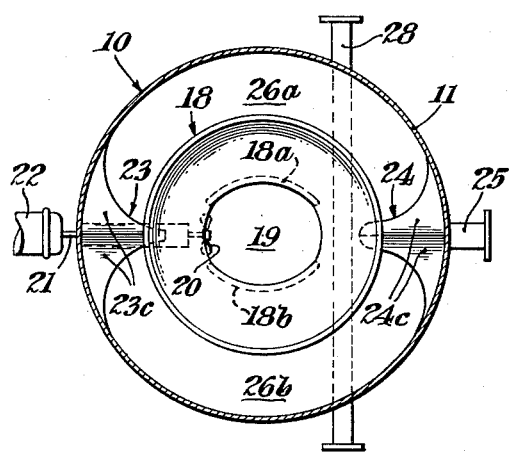
FIG. 3 is a horizontal sectional view of the blow tank taken on the line 3—3 of FIG. 1.

In operation, concentrated stock, having a consistency of from about 10 to 12 percent solids, is discharged or blown at full or partial steam pressures at cooking temperatures of from about 250° F. to 400° F. from a pressure cooker or digester into the blow tank 10, operating at substantially atmospheric pressure, for dilution to about 1 to 6 percent solids, for flashing steam therefrom, and for storage therein until required by later processing operations. The stock enters flash zone A of blow tank 10 through blow pipe 29 and conduit 31 and passes through the vertical elongated opening 30 thereby forming the stock into a flattened spiral band which descends around the interior of wall 11 to the level of the stock standing within zone A of the tank. As diluted stock is removed from the tank, concentrated stock descends therein and passes through restricting baffle 14 to annular opening 14a whereat dilution liquors, entering through annular orifice 16a from dilution liquor distribution zone 16, and dilute stock, entering through annular orifice 15c, are introduced into and mixed with the descending concentrated stock. The resulting mixture passes into stock dilution zone B, descends along the contours of transition piece 18c, and passes into mixing space 19 wherein the mixture is intimately blended by impeller 20 into a pumpable consistency during circulation through spaces 26a, 26b and 27 as illustrated by flow indicating arrows in FIGURES 1, 2 and 3. The positioning of recirculation baffle 23, stock outlet structlure 24 and directional vanes 18a and 18b on base 12 as illustrated in FIGURE 2, enhances the fluid circulation of dilute stock while minimizing stock pile-up thereon. The flow pattern within zone B is not only in a horizontal direction through spaces 26a and 26b but also in a vertical direction through annular space 27 thereby permitting dilute stock to be introduced through annular orifice 15c into the descending concentrated stock as described hereinbefore. Dilute stock passing through screens 24a and 24b, which inhibit the passage of knots of fibers and deleterious particles, is continuously withdrawn through outlet pipe 25. The deleterious material is collected and removed through tramp iron trap 28.

Since the blow tank 10 may be designed for a storage holding volume of from one-quarter to one-half hour capacity or more, the tank may function as a polisher for occasional coarse cooks by admitting active cooking liquors with the dilution liquors. The active chemicals may act on the knots of fibers, restrained by screens 24a and 24b from passing with dilute stock through stock outlet 25, until these knots are sufficiently reduced in size to permit passage through such screens.

As the descending concentrated stock spirals around the interior of wall 11, steam, continuously flashed from the descending stock, rises and passes through conduit 40 into condensing zone C of condenser 32 wherein the flash steam is condensed by cool condensing water passed to condensing water distribution zone 37 through inlet 38 via line 39 and sprayed through nozzles 36. The resultant condensate and condensing water is collected in the bottom of zone C and is discharged through condensate outlet 41 to line 42. Pipe 43 and associated pressure and vacuum relief valves permit operation within desired pressure ranges and provide a path for removing noncondensable gases from condenser 32.

The hot condensate in line 42 enters accumulator 44 through tangentially terminated inlet pipe 52 and descends around the interior of wall 45 to directing baffle 53 whereupon it is directed to the shell side of heat exchanger 48. Cooling water enters the tube side of exchanger 48 through header 48b and line 49 and after indirect heat exchange with the condensate passes through header 48c and line 50 to hot water storage tank 51. The cooled condensate is collected and primarily channeled by baffle 54 to downcomer 55 wherein it flows to cold water zone D, which constitutes the source of the condensing water used by condenser 32. Water from zone D may be passed to condenser 32 through outlet 56, line 57, pump 65 and line 39.

Above cold water zone D is hot water zone E, the level of which is normally determined by the height of the overflow weir 60 from the base 46. Since the flow of the condensate and condensing water entering the accumulator tank 44 will exceed the flow of the condensing water leaving therefrom, excess condensing water from cold water zone D will rise through overflow pipe 58 and will pass over weir 60 to be discharged through outlet 61, thereby preventing the water level of zone E from rising to inlet pipe 52.

Accumulator 44 is provided with vent pipe 47a, which permits the expurgation of noncondensable gases, and sludge outlet 62, which permits the periodic removal of such digested pulp as may be carried over with the condensate entering the accumulator.

While I have shown and described a preferred form of my invention, I am aware that variations may be made thereto and I, therefore, desire a broad interpretation of my invention within the scope of the disclosure herein and the following claims.

I claim:

1. A blow tank for treating digested cellulose-containing materials, comprising a tank; an annular restricting baffle for dividing said tank into an upper flash steam zone and a lower stock dilution zone, said upper zone having restricted communication with said lower zone through said baffle; inlet means for admitting materials to be treated to said upper zone; an annular inlet means below said baffle for admitting treating liquors to said lower zone and across the flow of materials passing from said upper zone to said lower zone; mixing means within said lower zone for intimately blending and diluting said digested materials with said treating liquors; outlet means for withdrawing treated materials from said lower zone; outlet means for withdrawing flash steam from said upper zone; a jet condenser mounted on said blow tank and associated with the steam outlet means for condensing said flash steam by direct contact of said steam with a condensing fluid.

2. A blow tank for treating digested cellulose-containing materials, comprising a tank; an annular restricting baffle of downwardly converging configuration positioned intermediate the top and base of said tank, said baffle dividing said tank into an upper flash steam zone and a lower stock dilution zone, said upper zone having restricted communication with said lower zone through an opening formed by the free edge of said baffle; inlet means arranged for tangential discharge of said materials to be treated into said upper zone; an annular plate positioned below said baffle and extending across said tank to a point short of the free edge of said baffle thereby forming with said baffle and the wall of said tank an annular treating liquor chamber having an annular orifice adjacent the free edge of said baffle for admitting treating liquors from said chamber to said lower zone across the flow of materials passing from said upper zone to said lower zone; a mixing baffle centrally mounted within said lower zone including an upper transition piece and lower directional vanes and forming a stock circulation zone with the wall of said tank, said directional vanes forming a mixing done therebetween a mixer-impeller extending into said mixing zone for circulating said digested materials and treating liquors from said mixing zone to said circulation zone wherein said materials are intimately blended and diluted with said treating liquors; a screened outlet means for withdrawing treated materials from said circulation zone; and means for withdrawing flash steam from said upper zone.

3. A blow tank for treating digested cellulose-containing materials, comprising a tank; an annular baffle for dividing said tank into an upper flash steam zone and a lower stock dilution zone, said upper zone having restricted communication with said lower zone through said baffle; inlet means for admitting materials to be treated to said upper zone; annular inlet means below said baffle for admitting treating liquors to said lower zone and across the flow of materials passing from said upper zone to said lower zone; mixing means within said lower zone for intimately blending and diluting said digested materials with said treating liquors; screened outlet means for withdrawing treated materials from said lower zone; a steam outlet conduit extending from the top of said blow tank for withdrawing flash steam from said upper zone; a jet condenser positioned on said tank and surrounding said conduit, said condenser comprised of a cylindrical outer wall forming an annular flash condensing zone with said conduit, and an annular condensing water distribution header enclosing said condensing zone and adapted to provide an annulus of condensing water jets for spraying condensing water into said condensing zone and across the flow of steam leaving said upper zone; inlet means for admitting condensing water to said distribution header; outlet means for withdrawing condensate and condensing fluid from said condensing zone; and means extending into said condenser for withdrawing noncondensable gases therefrom.

4. A blow tank for treating digested cellulose-containing materials, comprising a tank; an annular baffle of downwardly converging configuration positioned intermediate to the top and base of said tank, said baffle dividing said tank into an upper flash steam zone and a lower stock dilution zone, said upper zone having restricted communication with said lower zone through an opening formed by the free edge of said baffle; inlet means arranged for tangential discharge of said materials to be treated into said upper zone; an annular plate positioned below said baffle and extending across said tank to a point short of the free edge of said baffle thereby forming with said baffle and the wall of said tank an annular treating liquor chamber having an annular orifice adjacent the free edge of said baffle for admitting treating liquors from said chamber to said lower zone across the flow of materials passing from said upper zone to said lower zone; a mixing baffle centrally mounted within said lower zone including an upper transition piece and lower directional vanes and forming a stock circulation zone with the wall of said tank, said directional vanes forming a mixing zone therebetween; a mixer-impeller extending into said mixing zone for circulating said digested materials and treating liquors from said mixing zone to said circulation zone wherein said materials are intimately blended and diluted with said treating liquors; screened outlet means for withdrawing treated materials from said circulation zone; a steam outlet conduit extending from the top of said blow tank for withdrawing flash steam from said upper zone; a jet condenser positioned on said tank and surrounding said conduit, said condenser comprised of a cylindrical outer wall forming an annular flash condensing zone with said conduit and an annular condensing water distribution header enclosing said condensing zone and adapted to provide an annulus of condensing water jets for spraying condensing water into said condensing zone and across the flow of steam leaving said upper zone; inlet means for admitting condensing water to said distribution header; outlet means for withdrawing condensate from said condensing zone; and means extending into said condenser for withdrawing noncondensable gases therefrom.

5. A blow tank for treating digested cellulose-containing materials, comprising an annular, downwardly converging baffle for dividing said tank into an upper flash steam zone and a lower stock dilution zone, said upper zone having restricted communication with said lower zone through an opening formed by the free edge of said baffle; inlet means for admitting materials to be treated to said upper zone; an annular plate positioned below said baffle and extending across said tank to a point short of the free edge of said baffle thereby forming with said baffle and the wall of said tank an annular treating liquor chamber having an annular orifice adjacent the free edge of said baffle for admitting treating liquors from said chamber to said lower zone across the flow of materials passing from said upper zone to said lower zone; a mixing baffle centrally mounted within said lower zone including an upper transition piece and lower directional vanes and forming a stock circulation zone with the wall of said tank, said directional vanes forming a mixing zone therebetween; a mixer-impeller extending into said mixing zone for circulating said digested materials and treating liquors from said mixing zone to said circulation zone wherein said materials are intimately blended and diluted with said treating liquors; outlet means including screened walls for withdrawing treated materials from said circulation zone; outlet means for withdrawing flash steam from said upper zone; and a jet condenser associated with the steam outlet means for condensing said flash steam by direct contact of said steam with a condensing fluid.

6. A blow tank for treating digested cellulose-containing materials, comprising a baffle for dividing said tank into upper flash steam zone and a lower stock dilution zone, said upper zone having restricted communication with said lower zone through said baffle; inlet means for admitting materials to be treated to said upper zone; inlet means for admitting treating liquors to said lower zone; outlet means for withdrawing treated materials from said lower zone; a steam outlet conduit extending from the top of said blow tank for withdrawing flash steam from said upper zone; a jet condenser positioned on said tank and surrounding said conduit said condenser comprised of a cylindrical outer wall forming an annular flash condensing zone with said conduit, and an annular condensing water distribution header enclosing said condensing zone and adapted to provide an annulus of condensing water jets for spraying condensing water, into said condensing zone and across the flow of steam leaving said upper zone; inlet means for admitting condensing water to said distribution header; outlet means for withdrawing condensate and condensing water from said condensing zone; and means extending into said condensing zone for withdrawing noncondensable gases therefrom.

7. A blow tank for treating digested cellulose-containing materials, comprising an annular restricting baffle of downwardly converging configuration positioned intermediate to the top and base of said tank, said baffle dividing said tank into an upper flash steam zone and a lower stock dilution zone, said upper zone having restricted communication with said lower zone through an opening formed by the free edge of said baffle; inlet means arranged for tangential discharge of said materials to be treated to said upper zone; an annular plate positioned below said baffle and extending across said tank to a point short of the free edge of said baffle thereby forming with said baffle and the wall of said tank an annular treating liquor chamber having an annular orifice adjacent the free edge of said baffle for admitting treating liquors from said chamber to said lower zone across the flow of materials passing from said upper zone to said lower zone; a mixing baffle centrally mounted within said lower zone including an upper transition piece and lower directional vanes and forming a stock circulation zone with the wall of said tank, said directional vanes forming a mixing zone therebetween; a mixer-impeller extending into said mixing zone for circulating said digested materials and treating liquors from said mixing zone to said circulation zone wherein said materials are intimately blended and diluted with said treating liquors; a screened outlet means for withdrawing treated materials from said circulation zone; a steam outlet conduit extending from the top of said blow tank for withdrawing flash steam from said upper zone; a jet condenser positioned on said tank and surrounding said conduit, said condenser comprised of a cylindrical outer wall forming an annular flash condensing zone with said steam conduit; an annular condensing water distribution header enclosing said condensing zone and adapted to provide an annulus of condensing water jets for spraying condensing water into said condensing zone and across the flow of steam leaving said upper zone; inlet means for admitting condensing water to said distribution header; outlet means for withdrawing condensate from said condensing zone; and means extending into said condenser for withdrawing noncondensable gases therefrom.

References Cited in the file of this patent

UNITED STATES PATENTS

| | | |
|---|---|---|
| 314,039 | Mayer | Mar. 17, 1885 |
| 405,142 | Worthington | June 11, 1889 |
| 1,265,330 | Hess | May 7, 1918 |
| 1,685,754 | Richter | Sept. 25, 1928 |
| 1,757,108 | Bell | May 6, 1930 |
| 1,908,615 | Oman | May 9, 1933 |
| 1,975,301 | Thorne | Oct. 2, 1934 |
| 2,342,225 | Schnyder | Feb. 22, 1944 |

OTHER REFERENCES

Pulp and Paper Manufacture, vol. I (1950), McGraw-Hill, Inc., page 326 relied upon.